US012569817B2

(12) United States Patent
Liu et al.

(10) Patent No.: US 12,569,817 B2
(45) Date of Patent: Mar. 10, 2026

(54) HYDRODYNAMIC CAVITATION GENERATING DEVICE AND METHOD

(71) Applicant: CHINA UNIVERSITY OF PETROLEUM (EAST CHINA), Qingdao (CN)

(72) Inventors: Cuiwei Liu, Qingdao (CN); Xuejie Li, Qingdao (CN); Qingshan Feng, Qingdao (CN); Yuxing Li, Qingdao (CN); Hui Han, Qingdao (CN); Qihui Hu, Qingdao (CN); Yihan Liao, Qingdao (CN); Yuanbo Yin, Qingdao (CN); Kang Xiao, Qingdao (CN); Hongchao Yang, Qingdao (CN); Rui Ding, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 462 days.

(21) Appl. No.: 18/029,828

(22) PCT Filed: Jan. 21, 2022

(86) PCT No.: PCT/CN2022/073273

§ 371 (c)(1),
(2) Date: Mar. 31, 2023

(87) PCT Pub. No.: WO2022/222565

PCT Pub. Date: Oct. 27, 2022

(65) Prior Publication Data

US 2023/0381722 A1 Nov. 30, 2023

(30) Foreign Application Priority Data

Apr. 20, 2021 (CN) ........................ 202110423812.7

(51) Int. Cl.
*B01F 23/232* (2022.01)
*B01F 25/00* (2022.01)

(52) U.S. Cl.
CPC ....... *B01F 23/232* (2022.01); *B01F 2025/911* (2022.01); *B01F 2025/931* (2022.01)

(58) Field of Classification Search
CPC .............. B01F 23/232; B01F 2025/911; B01F 2025/931; B01F 25/4335; B01F 27/25; C02F 1/34

(Continued)

(56) References Cited

U.S. PATENT DOCUMENTS 1,727,753 A * 9/1929 De Bethune ............ B01F 27/73 366/290
2,745,372 A * 5/1956 Chertoff ................. F02M 27/08 366/181.4

(Continued)

FOREIGN PATENT DOCUMENTS

CN 2720543 Y 8/2005
CN 104857904 A 8/2015

(Continued)

OTHER PUBLICATIONS

Apr. 21, 2022 International Search Report issued in International Patent Application No. PCT/CN2022/073273.

(Continued)

*Primary Examiner* — Charles Cooley
(74) *Attorney, Agent, or Firm* — Oliff PLC

(57) ABSTRACT

A hydrodynamic cavitation generating device and a method, including: a wheel disc, being provided with a plurality of flow passages, an orifice plate is provided inside the flow passages, and a throat orifice is provided on the orifice plate; a driving mechanism, being connected to the wheel disc, and configured to drive a rotation of the wheel disc; and a (Continued)

water-inlet pipe, being arranged fixedly, fitting with a first side end face of the wheel disc, and may inject water into the flow passage when being aligned with the flow passage; the cavitation effect obtained by using the hydraulic cavitation generating device is better.

9 Claims, 5 Drawing Sheets

(58) Field of Classification Search
USPC ................................ 366/264, 302, 304, 305
See application file for complete search history.

(56) References Cited

U.S. PATENT DOCUMENTS

| | | | | |
|---|---|---|---|---|
| 2,798,698 | A * | 7/1957 | Dooley | D01D 1/065 366/182.1 |
| 3,525,504 | A * | 8/1970 | Colwell | B01F 27/50 366/328.2 |
| 5,810,052 | A * | 9/1998 | Kozyuk | B01F 25/42 138/40 |
| 5,937,906 | A * | 8/1999 | Kozyuk | B01F 25/4521 138/40 |
| 7,762,715 | B2 * | 7/2010 | Gordon | B01F 25/4335 138/40 |
| 2004/0251566 | A1 * | 12/2004 | Kozyuk | B01F 25/434 261/76 |
| 2006/0081541 | A1 * | 4/2006 | Kozyuk | C02F 1/72 210/748.15 |
| 2008/0202601 | A1 * | 8/2008 | Ando | B01F 25/4412 251/213 |
| 2010/0103768 | A1 * | 4/2010 | Gordon | B01F 25/4335 366/165.4 |
| 2013/0062249 | A1 * | 3/2013 | Kozyuk | C10G 15/08 208/14 |
| 2014/0263093 | A1 | 9/2014 | Sprague | |
| 2015/0321161 | A1 | 11/2015 | Oklejas, Jr. | |
| 2016/0175791 | A1 * | 6/2016 | Kozyuk | B01F 27/2722 366/118 |
| 2017/0007976 | A1 * | 1/2017 | Kozyuk | B01J 19/185 |
| 2017/0291150 | A1 * | 10/2017 | Kozyuk | B01F 25/45211 |
| 2023/0381722 | A1 * | 11/2023 | Liu | B01F 25/4335 |

FOREIGN PATENT DOCUMENTS

| | | | | |
|---|---|---|---|---|
| CN | 107228090 A | | 10/2017 | |
| CN | 107244709 A | | 10/2017 | |
| CN | 109704438 A | | 5/2019 | |
| CN | 109824226 A | | 5/2019 | |
| CN | 113120990 A | | 7/2021 | |
| GB | 2321719 A | * | 8/1998 | B01F 31/80 |

OTHER PUBLICATIONS

Apr. 21, 2022 Written Opinion of the International Searching Authority issued in International Patent Application No. PCT/CN2022/073273.

* cited by examiner

HYDRODYNAMIC CAVITATION GENERATING DEVICE AND METHOD

CROSS-REFERENCES TO RELATED APPLICATIONS

This application claims priority benefits to Chinese Patent Application No. 202110423812.7, filed 20 Apr. 2021, the contents of which are incorporated herein by reference.

TECHNICAL FIELD

The present invention relates to the technical field of hydrodynamic cavitation application, and specifically to a hydrodynamic cavitation generating device and a method.

BACKGROUND

The statements in this section merely provide background related to the present invention and do not necessarily constitute prior art.

At present, cavitation is gradually playing a role in the fields of wastewater treatment, medical treatment, chemistry, material processing, etc., wherein, compared with laser and ultrasonic cavitation, hydrodynamic cavitation has advantages such as simple operation and low cost, and is a hot spot for current research, and the traditional hydrodynamic cavitation generating devices mostly adopt an orifice plate structure, a structure combining orifice plate and venturi tube, or a centrifugal impeller structure.

The inventors found that the current cavitation generating devices with orifice plate, combined orifice plate and venturi tube are based on steady-state cavitation, but the cavitation effect will weaken as cavitation proceeds and the cavitation effect is not good, while the cavitation generated by the existing cavitation devices with centrifugal impeller structure occurs inside the cavity, which is difficult to be applied in the field of material processing and so on.

SUMMARY

For overcoming the shortcomings of the prior art, it is an objective of the present invention to provide a hydrodynamic cavitation generating device, which may produce more intense cavitation and have better cavitation effect.

To achieve the above purpose, the present invention uses the following technical solutions:

In a first aspect of the present invention, an example provides a hydrodynamic cavitation generating device, comprising:

- a wheel disc, being provided with a plurality of flow passages, an orifice plate is provided inside the flow passages, and a throat orifice is provided on the orifice plate;
- a driving mechanism, being connected to the wheel disc, and configured to drive a rotation of the wheel disc; and
- a water-inlet pipe, being arranged fixedly, fitting with a first side end face of the wheel disc, and may inject water into the flow passage when being aligned with the flow passage.

Optionally, further comprising a water tank, the wheel disc is set inside the water tank, a water-outlet of the water tank is connected to a water-inlet of a circulation pump through a pipeline, and a water-outlet of the circulation pump is connected to the water-inlet pipe through the pipeline.

Optionally, the wheel disc is rotatably connected to a bracket; the bracket is fixed inside the water tank.

Optionally, the flow passages are evenly distributed along a circumference centered on the center of the wheel disc.

Optionally, a first end of the water-inlet pipe is provided with a sealing ring, and the water-inlet pipe is in sealed contact with the first side end face of the wheel disc through the sealing ring.

Optionally, an inner diameter of the water-inlet pipe is not less than a diameter of the flow passage.

Optionally, the driving mechanism comprises a driving member; the driving member is connected to the wheel disc through a transmission mechanism, and can drive the rotation of the wheel disc through the transmission mechanism.

Optionally, the transmission mechanism adopts a belt transmission mechanism or a gear transmission mechanism.

In a second aspect of the present invention, an example provides a method for generating cavitation by using a hydrodynamic cavitation generating device, comprising: submerging a wheel disc in water, driving the wheel disc to rotate by a driving mechanism, introducing a water flow with a set pressure into a water-inlet pipe, and when the wheel disc rotates until a set flow passage is aligned with the water-inlet pipe, the water in the set flow passage is converted from static to flowing according to a set speed, generating cavitation bubbles.

Optionally, lubricating oil is applied to an end face of the wheel disc in contact with the water-inlet pipe.

Beneficial Effects of the Present Invention are as Follows:

1. According to the hydrodynamic cavitation generating device of the present invention, the water in the wheel disc can be converted from a static state to a flowing state through the rotation of the wheel disc driven by the driving mechanism, which realizes an unsteady-state cavitation; moreover, realizing the continuous generation of the unsteady-state cavitation of a plurality of flow passages, and the cavitation bubbles are generated in the unsteady-state, so that the generated cavitation has higher intensity and higher pressure.

2. According to the hydrodynamic cavitation generating device of the present invention, the flow passages of the wheel disc are connected to the external space, and compared with the traditional centrifugal impeller structure, the bubbles can flow out through the flow passages, which is convenient to be applied in the field of material processing, etc.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
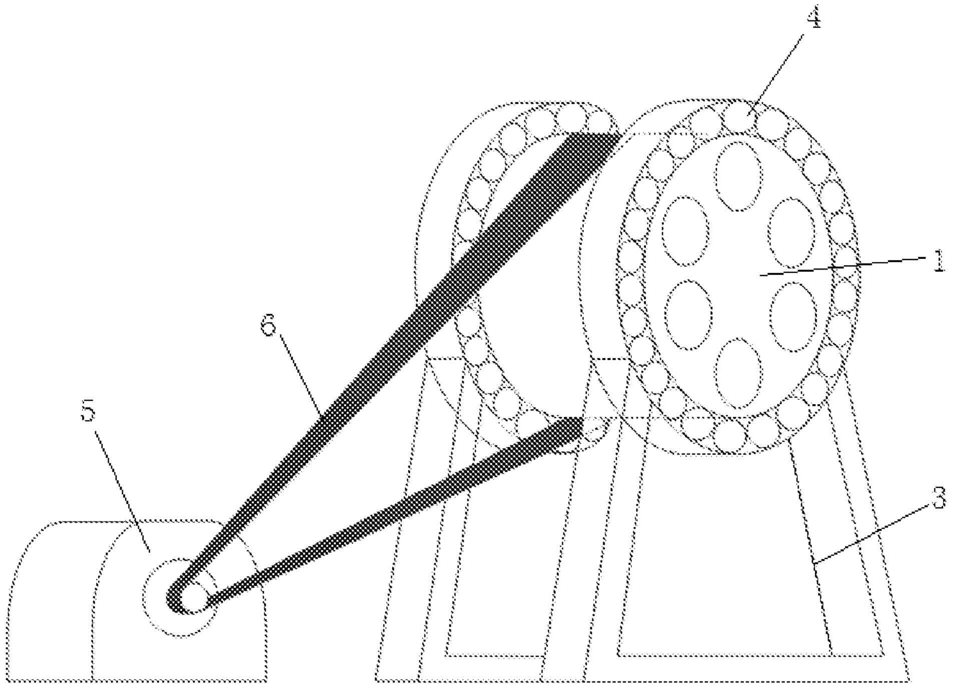
FIG. 1 is a schematic diagram of an overall structure of Example 1 of the present invention.
Figure 2:
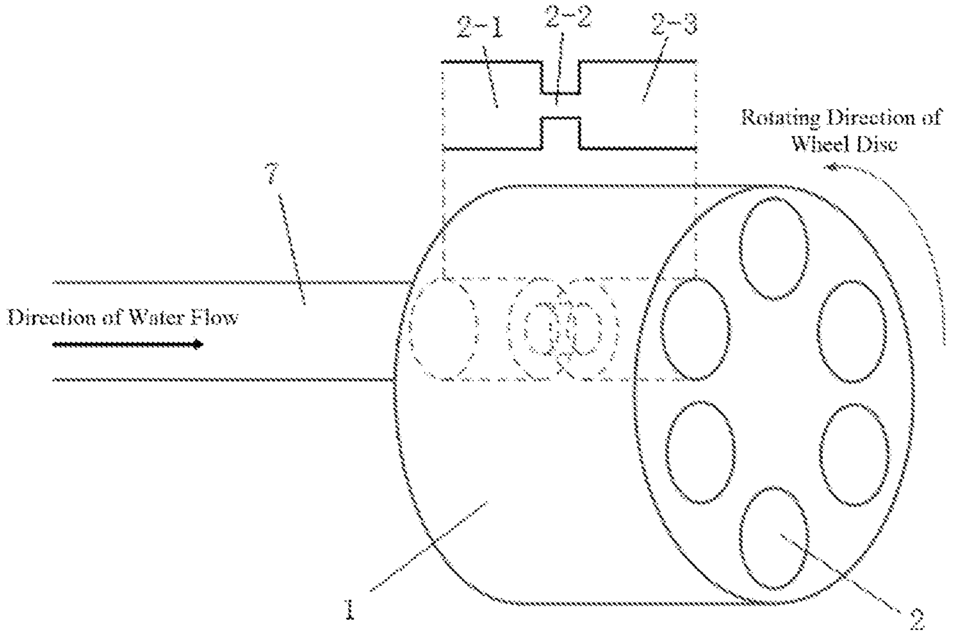
FIG. 2 is a schematic diagram of an assembly of a water-inlet pipe and a wheel disc of Example 1 of the present invention.

Wherein, 1 wheel disc; 2 flow passage; 2-1 first flow passage section; 2-2 throat section; 2-3 second flow passage section; 3 bracket; 4 bearing; 5 drive motor; 6 belt transmission mechanism; 7 water-inlet pipe.

DETAILED DESCRIPTION

Example 1

The present example discloses a hydrodynamic cavitation generating device. In the present example, the steady state refers to a state when a flow velocity of a fluid reaches a steady state, and the unsteady state refers to a state when the flow velocity of the fluid changes.

The hydrodynamic cavitation generating device of the present example comprises a wheel disc, a water-inlet pipe, a driving mechanism, a water tank and a circulation pump.

The wheel disc is of a cylindrical disc structure, a plurality of flow passages are provided on the wheel disc, and evenly distributed along a circumference centered on the center of the wheel disc.

In the present example, there are six flow passages 2 are opened on the wheel disc 1, and the six flow passages are evenly distributed along the circumference.

An orifice plate is provided at a center of an inner part of the flow passages, and a throat hole coaxially arranged with the flow passage is provided on the orifice plate, so that a section of the flow passage is divided into a first flow passage section 2-1, a throat section 2-2 and a second flow passage section 2-3, which are provided in sequence. Wherein, inner diameters of the first flow passage section and the second flow passage section are equal and both are larger than an inner diameter of the throat section.

The wheel disc is rotatably connected to a bracket 3 through a bearing 4, specifically, the two ends of the wheel disc are fixedly connected to an inner ring of the two bearings, and an outer ring of the two bearings are fixedly connected to the bracket, the bracket is fixed inside the water tank, and after the water is poured into the water tank, the wheel disc can be submerged in the water; the wheel disc is connected to the driving mechanism, and the driving mechanism can drive the wheel disc to rotate around its own axis.

The driving mechanism comprises a driving member, in the present example, the driving member adopts a drive motor 5, the drive motor is provided outside the water tank, and an output shaft of the drive motor is connected to the wheel disc via a transmission mechanism, which can drive the wheel disc to rotate around its own axis.

In one example, the transmission mechanism adopts a belt transmission mechanism 6, the belt transmission mechanism comprises an active wheel and a drive belt, the active wheel is fixedly connected to the output shaft of the drive motor, and the drive belt is wound between the active wheel and the wheel disc.

In another example, the transmission mechanism may also adopt a gear transmission mechanism, accordingly, gear teeth need to be provided on an outer circumference of the wheel disc to mesh with a transmission gear, and the transmission gear is connected to the output shaft of the drive motor.

The water-inlet pipe 7 is arranged fixedly, and the water-inlet pipe is made of rigid material, the water-inlet pipe can be fixed on the water tank or fixed by other brackets, the ends of the water-inlet pipe are provided with a sealing ring, preferably, the sealing ring adopts a rubber sealing ring, the end of the water-inlet pipe is sealed contact with an end face of a first side of the wheel disc through the sealing ring, in the present example, an inner diameter of the water-inlet pipe is equal to a diameter of the flow passage. When the wheel disc is rotated under the action of the driving mechanism, the water-inlet pipe can be connected with different flow passages.

The water-inlet pipe is connected to a water-outlet of the circulation pump provided outside the water tank through a pipeline, and a water-inlet of the circulation pump is connected to a water-outlet of the water tank through the pipeline, and the circulation pump can pump the water in the water tank into the water-inlet pipe, so that the water in the water-inlet pipe is jetted out at a set pressure and speed.

In the present example, the outer circumference of the wheel disc is also provided with a protective cover to prevent water droplets from splashing out of the water tank.

Example 2

The present example discloses a method for generating cavitation by using a hydrodynamic cavitation generating device of Example 1, comprising:

- pouring water in a water tank to submerge a wheel disc in the water, starting a circulation pump and a drive motor to drive the wheel disc to rotate, when a flow passage on the wheel disc is aligned with a water-inlet pipe, the static water in the flow passage is changed into the water flowing according to a set flow rate by the impact of the water in the water-inlet pipe, realizing unsteady-state cavitation and generating cavitation bubbles, when the wheel disc rotates and the water-inlet pipe is aligned with a next flow passage, the water in the next flow passage carries out the unsteady-state cavitation.

Figure 3:
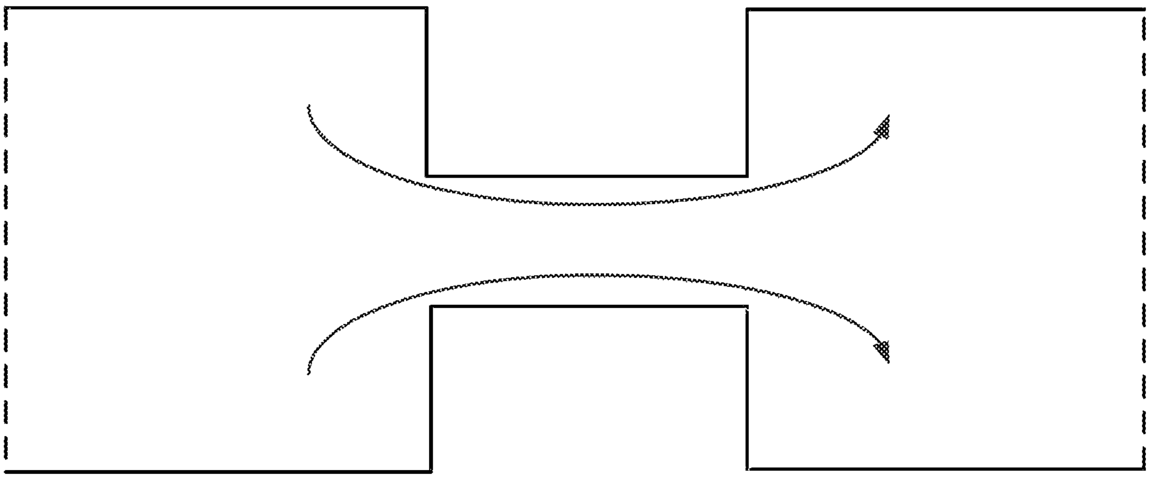
FIG. 3 is a diagram of flow direction of existing steady-state cavitation generating devices in operation.
Figure 4:
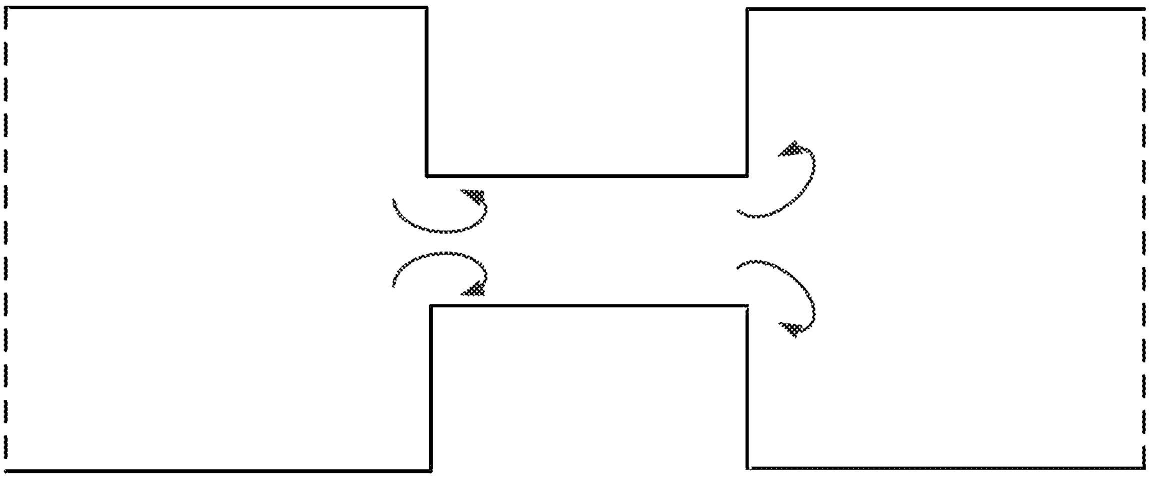
FIG. 4 is a diagram of flow direction of an unsteady-state cavitation generating device of Example 2 of the present invention in operation.

When the existing cavitation generating device with the structure of an orifice plate or orifice plate combined with venturi tube works, as shown in FIG. 3, a vortex in the throat section of the orifice plate during steady-state flow is no longer obvious, and there is no longer even a vortex behind an outlet of the throat section, so the cavitation effect is not good; while in the present example, unsteady-state cavitation is adopted in the flow passage, as shown in FIG. 4, the inlet and outlet of the throat section have obvious vortex thus promoting the occurrence of initial cavitation, so that the generated cavitation intensity is higher, and the pressure is also higher.

Figure 5:
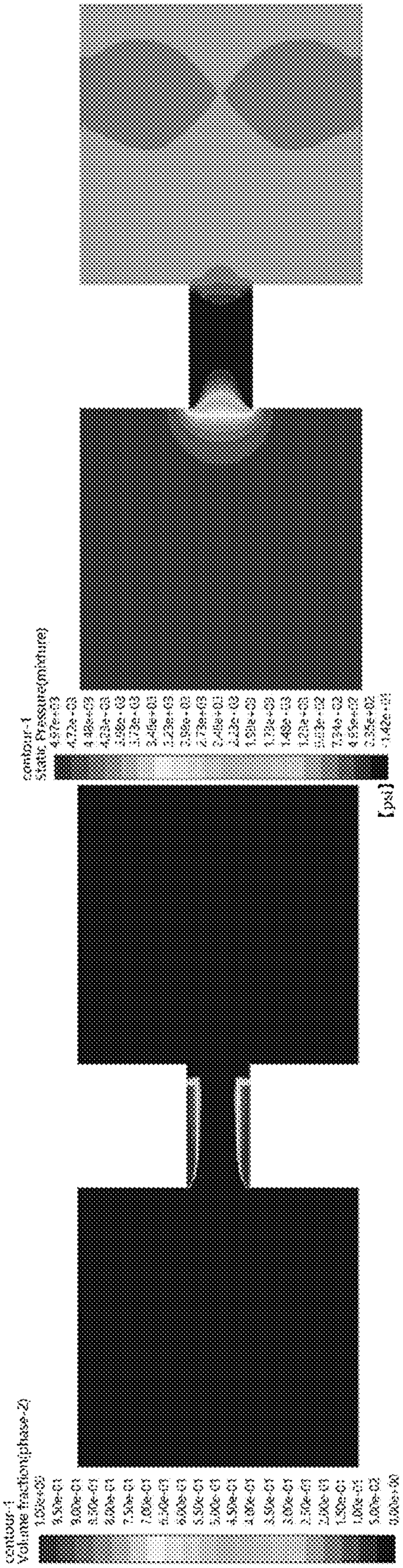
FIG. 5 is a simulation diagram of cavitation during a conventional steady-state flow.
Figure 6:
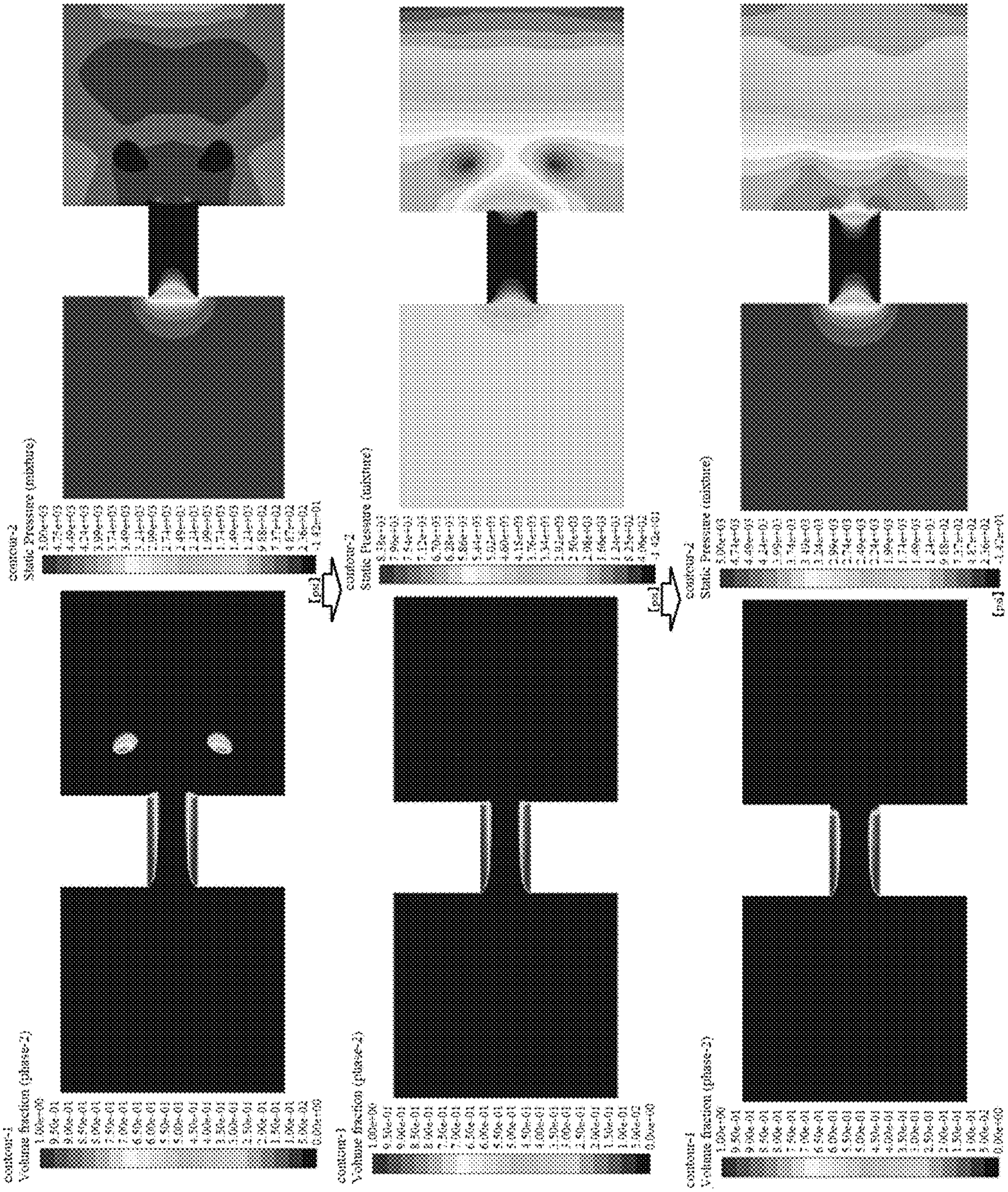
FIG. 6 is a simulation diagram of cavitation of Example 2 of the present invention during an unsteady-state flow.
Figure 7:
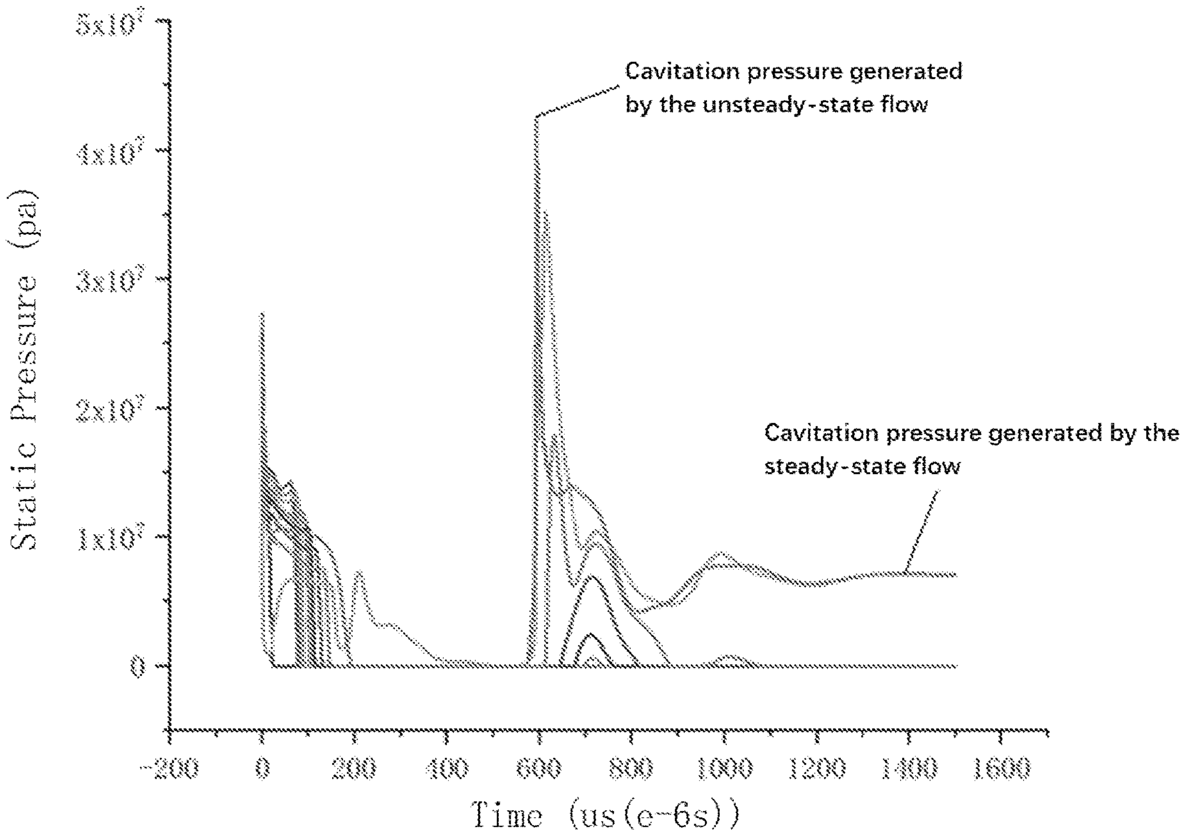
FIG. 7 is a diagram of cavitation pressure curves of Example 2 of the present invention during the cavitation.

The simulation diagram of cavitation during the conventional steady-state flow is shown in FIG. 5, and the simulation diagram of cavitation during an unsteady-state flow in the present example is shown in FIG. 6, and the cavitation pressure generated during the unsteady-state flow and the steady-state flow is shown in the curves of FIG. 7. It can be seen through the figures that during the cavitation, the generated bubbles collapse at a certain instant and generate instantaneous high pressure, and the generated cavitation pressure during the unsteady-state flow is significantly higher than the cavitation pressure generated during the steady-state flow, and the number of cavitation bubbles generated during the steady-state flow is less and the pressure is more stable.

The cavitation generating device of the present example can make the flow passage always in the unsteady-state flow to generate cavitation bubbles, with good cavitation effect and high cavitation pressure.

Compared with the traditional centrifugal impeller cavitation generating device, in the present example, the flow passage is connected to the external space of the wheel disc, a first end of the flow passage can be aligned with the water-inlet pipe, and a second end thereof can be used for the outflow of cavitation bubbles, and the material to be processed can be placed on the side where the cavitation bubbles flow out from the flow passage, so as to achieve the process of material.

In the present example, the parameters of the circulation pump, the water-inlet pipe and the flow passage can be determined by numerical simulation according to the actual need of pressure, the generation time of cavitation instantaneous high pressure can be determined according to the test, so as to determine the rotation period of the wheel disc, and the rotation of the wheel disc can be started according to the determined rotation period of the wheel disc.

In the present example, lubricating oil is applied to the end face of the contact between the wheel disc and the sealing ring of the water-inlet pipe after an interval of set time to reduce the friction between the sealing ring and the water-inlet pipe.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

What is claimed is:

1. A hydrodynamic cavitation generating device, comprising:

- a wheel disc provided with a plurality of flow passages, each flow passage having a throat orifice therein;
- a driving mechanism connected to the wheel disc and configured to drive a rotation of the wheel disc; and
- a water-inlet pipe that fits with a first side end face of the wheel disc, and is configured to inject water into a predetermined one of the flow passages when aligned with the predetermined one of the flow passages;
- wherein a first end of the water-inlet pipe is provided with a sealing ring and the water-inlet pipe is in sealed contact with the first side end face of the wheel disc through the sealing ring.

2. The hydrodynamic cavitation generating device according to claim 1, further comprising a water tank, wherein the wheel disc is set inside the water tank, a water-outlet of the water tank is connected to a water-inlet of a circulation pump through a pipeline, and a water-outlet of the circulation pump is connected to the water-inlet pipe through the pipeline.

3. The hydrodynamic cavitation generating device according to claim 2, wherein the wheel disc is rotatably connected to a bracket, and the bracket is fixed inside the water tank.

4. The hydrodynamic cavitation generating device according to claim 1, wherein the flow passages are evenly distributed along a circumference centered on a center of the wheel disc.

5. The hydrodynamic cavitation generating device according to claim 1, wherein an inner diameter of the water-inlet pipe is not less than a diameter of the flow passage.

6. The hydrodynamic cavitation generating device according to claim 1, wherein the driving mechanism comprises a driving member, and the driving member is connected to the wheel disc through a transmission mechanism, and is configured to drive the rotation of the wheel disc through the transmission mechanism.

7. The hydrodynamic cavitation generating device according to claim 6, wherein the transmission mechanism comprises a belt transmission mechanism or a gear transmission mechanism.

8. A method for generating cavitation by using the hydrodynamic cavitation generating device of claim 1, comprising:

- submerging the wheel disc in water,
- driving the wheel disc to rotate by the driving mechanism, and
- introducing a water flow with a set pressure into the water-inlet pipe,
- wherein when the wheel disc rotates until the predetermined one of the flow passages is aligned with the water-inlet pipe, the water in the predetermined one of the flow passages is converted from static to flowing according to a set speed, generating cavitation bubbles.

9. The method for generating cavitation by using the hydrodynamic cavitation generating device according to claim 8, wherein lubricating oil is applied to an end face of the wheel disc in contact with the water-inlet pipe.

* * * * *